Sept. 29, 1964 W. A. JACOBS ETAL 3,151,192
METHOD OF EXTRUDING A FOAMED THERMOPLASTIC PRODUCT
Filed Sept. 27, 1961 2 Sheets-Sheet 1
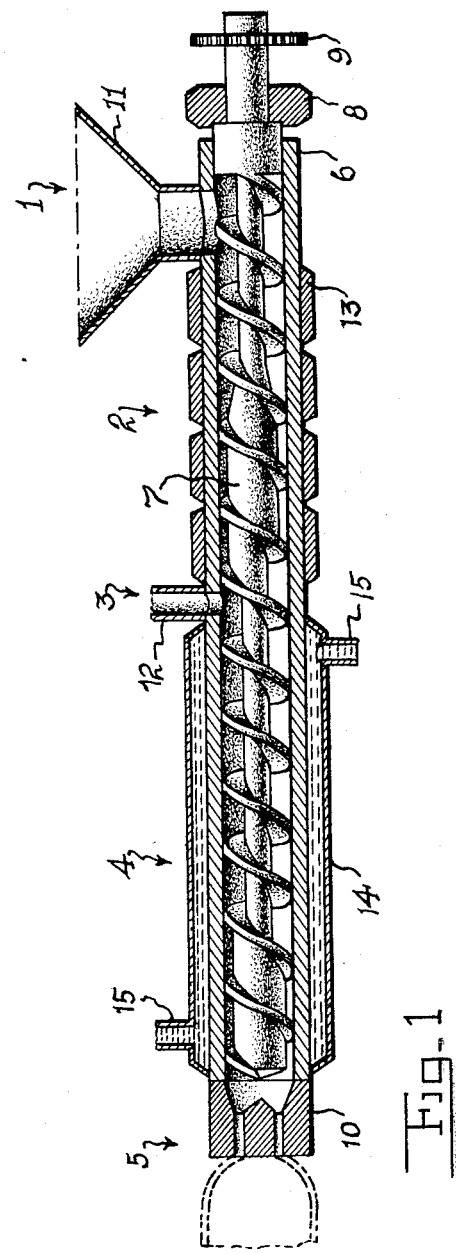
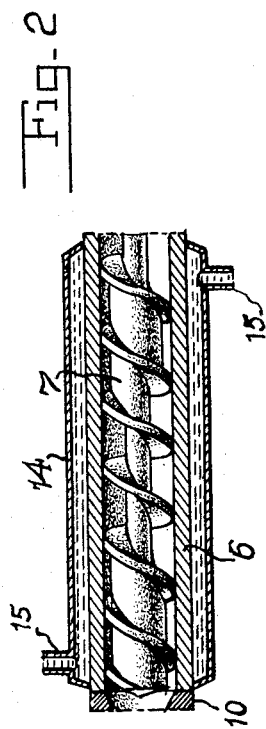
Inventors.
William A. Jacobs
& Frederick H. Collins
BY Fisher, Christen &
Sabaloon
Attorneys.

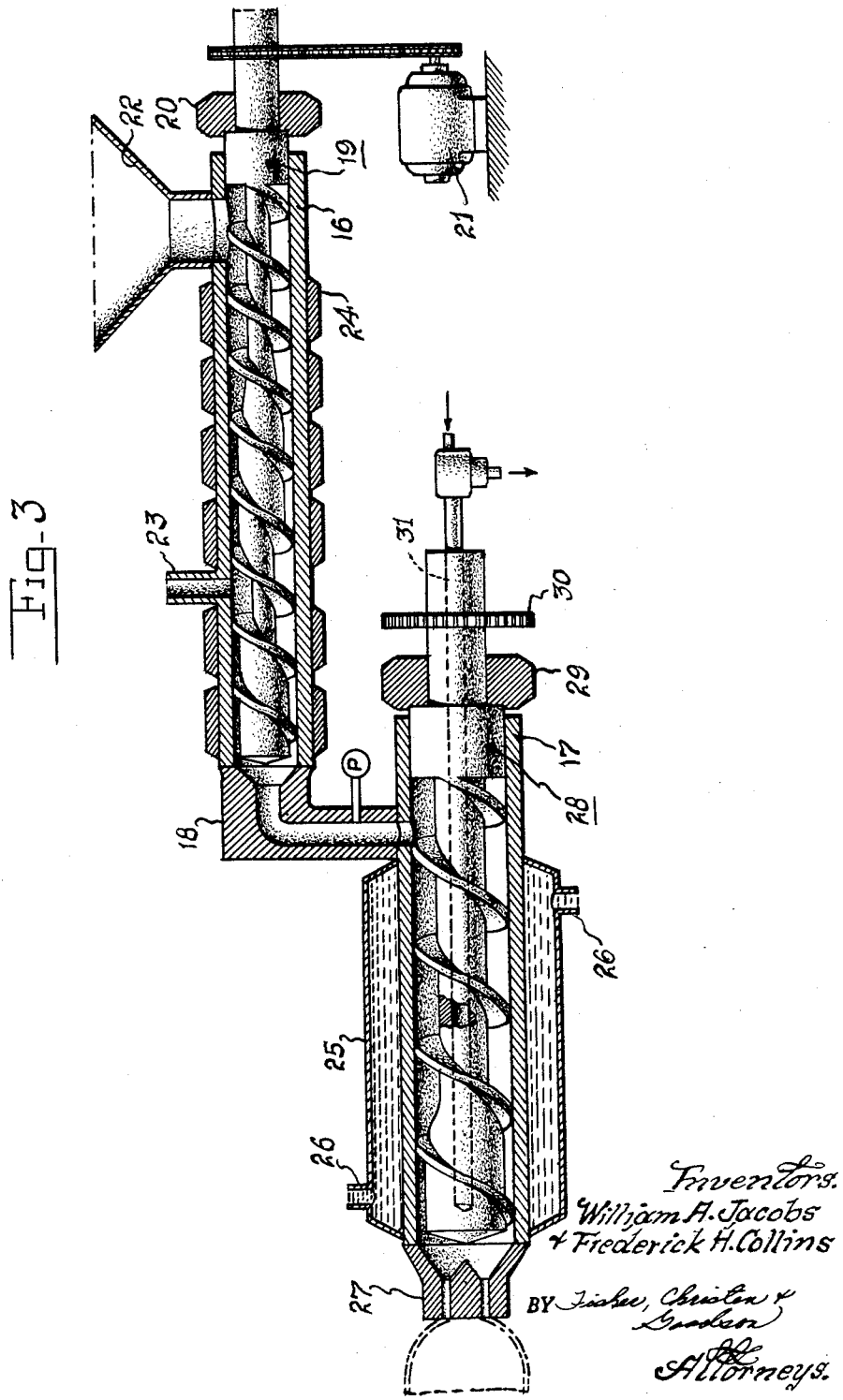

United States Patent Office 3,151,192
Patented Sept. 29, 1964

3,151,192
METHOD OF EXTRUDING A FOAMED
THERMOPLASTIC PRODUCT
William A. Jacobs and Frederick H. Collins, both of
Ellenville, N.Y., assignors to Sun Chemical Corporation, New York, N.Y., a corporation of Delaware
Filed Sept. 27, 1961, Ser. No. 145,524
2 Claims. (Cl. 264—53)

This invention relates to a novel process for producing extruded thermoplastic materials and more particularly relates to an extrusion process for extruding and foaming thermoplastic materials, such as polystyrene by the use of blowing agents and cell size control additives.

Heretofore, several methods and many varieties of apparatus have been employed for converting thermoplastic materials into extruded, foamed products. One of these methods and apparatus involves the use of a low boiling, normally liquid substance, intimately integrated with the thermoplastic material and a cell size control additive homogeneously admixed with the thermoplastic material. This method, for example, employs particles of the thermoplastic material such as polystyrene into which a low boiling normally liquid substance, such as pentane, is integrated and on the surface of which is coated a cell size control additive such as sodium bicarbonate and a solid organic acid. The coated particles are placed into the hopper of a conventional plastic extruder, wherein they are caused to melt and flow through the extrusion die of the extruder and expand upon leaving said extrusion die. If a foamed polystyrene sheet is desired, a circular extrusion die is employed to form an extruded foamed tube which is closed off by pinching rolls spaced from the die head of the extruder. Air is blown into the tube from the extrusion head to expand the tube into a bubble. The distance between the extrusion head and the pinching rolls is predetermined and the extrusion rate is such that the material is cooled sufficiently to a point of substantial dimensional stability. There results a flattened tube of foamed polystyrene which then is slit along both edges to provide two sheets of expanded polystyrene foam.

The prior art method described above has certain disadvantages, which somewhat limits its use. One prior art disadvantage is the wasteful loss of pentane from the extruder resulting in nonutilization of the total amount of pentane originally charged with the polystyrene in the hopper. A second disadvantage is the safety hazards caused by pentane, a highly inflammable gas, escaping from the extruder hopper into the atmosphere of the area. The escape of pentane through the hopper is exceedingly difficult to control thus requiring extensive ventilating equipment for the work area around the extruder in order to prevent the build-up of explosive concentrations of pentane. A further disadvantage of the prior art extrusion methods and apparatus is the troublesome clogging of feed materials in the hopper. Such clogging requires the use of special equipment or personnel to continuously force the feed materials down into the hopper.

It is a principal object of this invention to provide a novel method for extruding foamed thermoplastic materials.

Another object is the provision of extrusion methods for making expanded thermoplastic materials while avoiding the creation of hazardous conditions.

Another object is the provision of a novel foaming and extruding method employing thermoplastic materials and low boiling normally liquid substances which method and apparatus are characterized by a reduction or elimination of waste in the normally liquid substance.

A still further object is to provide a novel foaming and extrusion method for producing extruded foamed materials from a thermoplastic material, a low boiling normally liquid substance and cell size control additives which method and apparatus are characterized by the elimination of clogging difficulties of the feed materials.

Further objects and advantages of this invention will become apparent from the following detailed description of several embodiments thereof taken in conjunction with the appended drawings of which:

FIGURE 1 is a longitudinal cross section of one embodiment of the novel apparatus utilized in accordance with the invention;

FIGURE 2 is a longitudinal cross section in partial cutaway of a different embodiment of the mixing and cooling zone of the novel apparatus utilized in accordance with the invention;

FIGURE 3 is a longitudinal cross section of still another embodiment of the novel apparatus utilized in accordance with the invention.

Referring now to FIGURE 1 there is shown a cross section of an extruder comprising a feed and de-aerating zone 1, a heat plasticizing zone 2, an injection zone 3, a mixing and cooling zone 4, and an extrusion zone 5. The extruder generally comprises a cylinder 6, a forwarding screw 7, within said cylinder and supported at one end by bearing assembly 8 and driven at that end by drive assembly 9 and at the opposite end, from said drive and bearing assemblies, a die head 10 is connected to the cylinder 6. A feed hopper 11 is connected to the cylinder 6 at its end adjacent the bearing and drive assemblies 8 and 9. An injection tube 12 is connected intermediately along the cylinder length and communicates with said cylinder. Heat bands 13 are disposed about the cylinder portion between the hopper 11 and injection tube 12. A temperature control jacket 14 having inlets-outlets 15 is disposed about the cylinder portion between the injection tube 12 and the die head 10. In operation the thermoplastic material and cell size control additives are fed into the hopper 11, the heading bands 13 are energized, a heated fluid is circulated through the jacket 14 and the drive assembly is actuated to turn the forwarding screw to forward the thermoplastic material and cell size control additives through the cylinder. In the heat plasticizing zone 2, the thermoplastic material is heat plasticized at the desired temperature by heat provided from the heating bands 13 and is intermittently admixed with the cell size control additives such that a molten, homogeneous, admixed thermoplastic material at the desired temperature is delivered to the injection zone 3. Air and other volatiles are removed back out through the hopper 11 during passage of the mixture of the thermoplastic material and cell size control additives through the feed and de-aerating zone 1 and heat plasticizing zone 2 as a result of the compressive forwarding action of the screw 7 on said mixture.

The molten homogeneous mixture of thermoplastic material and cell size control additives is decompressed somewhat as a result of decrease in root diameter of the screw 7 as said mixture enters the injection zone. A low boiling normally liquid substance is metered under pressure into the cylinder 6 through the injection tube 12. It will be noted that during start-up it is desirable to forward the mixture of thermoplastic material and cell size control additives into the mixing and cooling zone 4, or possibly further, prior to metering in the normally liquid substance in order to prevent back-flow of said substance into heat plasticizing zone 2 and/or feed and de-aerating zone 1, which could result in irregular feeding. Additionally, during start-up, it is desirable to insure that the mixture being forwarded is maintained molten in the mixing and cooling zone 4 by circulating a heated fluid through the jacket 14. Generally, during start-up the thermoplastic material will probably foam in the mixing and cooling zone 4 prior to being extruded resulting in an inferior extruded product. As soon as the thermoplastic material freely flows through the cylinder, a coolant is circulated through jacket 14 to cool the thermoplastic mixture in zone 4 and thus prevent foaming prior to extrusion. The temperature in zone 4 is adjusted in accordance with the feed rate, the concentration of normally liquid substance and the pressure in zone 4 so as to prevent foaming in said zone prior to extrusion through die head 10. However, the thermoplastic mixture in zone 4 should not be cooled to the extent that the production rate is seriously decreased or to the extent that undue pressures are created within the cylinder 6 and die head 10 which could cause damage to the equipment. The length of mixing and cooling zone 4 is sufficiently large to provide homogeneous mixing of the thermoplastic material and cell size control additives with the low boiling, normally liquid substance and to provide at the same time adequate cooling of said mixture to prevent foaming within the cylinder 6 or die head 10.

In order to improve the mixing and cooling efficiency in zone 4, the configuration of that portion of the screw 7 disposed in said zone can be varied to provide one or more variations in its root diameter thereby providing fluctuations in pressures as the thermoplastic material passes through the zone. This is illustrated in FIGURE 2 wherein the root diameter in zone 4 first increases then decreases and finally increases once more prior to delivery of the thermoplastic material to the die head. The fluctuation in pressure provided by varying the root diameter of the screw 7 in zone 4 improves the mixing efficiency within said zone.

Referring now to FIGURE 3 there is shown another embodiment of the novel extrusion apparatus of this invention which provides advantages of conservation of space, improved drive means and improved cooling means. This embodiment is particularly adapted to high production rates which otherwise would not be practical on apparatus employing a single forwarding screw due to torque stresses imposed upon the screw. As shown in FIGURE 3, two cylinders 16 and 17 are provided and are interconnected by an adaptor 18 connected longitudinally to the delivery end of the first cylinder 16 and laterally to the top of the rear end of the second cylinder 17. A first forwarding screw 19 is provided in the first cylinder and is supported at one end by a bearing assembly 20 and is driven by a motor 21. At the same end of this first cylinder 16 there is provided a feed hopper 22. At an intermediate point along the first cylinder 16, there is provided an injection tube 23 which communicates internally with said cylinder. Heating bands 24 are disposed around the cylinder 16 from the feed hopper 22 past injection tube 23 to the end of the cylinder. The cylinder 16 from the feed hopper 22 to the injection tube 23 is essentially the same as that described in regard to FIGURE 1. The delivery end of the screw 19 can have an increased root diameter as shown in order to provide a sufficiently high pressure to force thermoplastic material through the adaptor 18 into the second cylinder 17.

The second cylinder 17 is provided with a temperature control jacket having inlets-outlets 26 for circulating heat transfer fluid therethrough. At the delivery end of cylinder 17 is provided an extrusion die head 27. A second forwarding screw 28 is disposed within the cylinder 17 and is supported at one end by the bearing assembly 29 and is driven by drive assembly 30. The second forwarding screw 28 is provided with channels 31 for circulating cooling fluid therethrough. The second forwarding screw 28 is substantially the same as the portions of the forwarding screw in the mixing and cooling zone 4 described in regard to FIGURE 1 and can be modified to resemble the forwarding screw shown in FIGURE 2.

The operation of the extruding apparatus shown in FIGURE 3 is generally the same as that with regard to the extruder shown and described in FIGURE 1. It will be noted, however, that the forwarding screws 19 and 28 are separately driven thereby eliminating undue torque stresses on the screw. Additional further means for cooling, namely the channels 31 in the second forwarding screw 28, are provided for obtaining more efficient cooling. A pressure gauge P is provided in the adaptor 18 to enable regulation of the rotational speeds of the respective forwarding screws 19 and 28. Thus undue pressures on the system, e.g. when the forwarding screw 19 is operating at a higher rate than forwarding screw 28, can be avoided. The pressure gauge can be replaced with a pressure sensitive limit switch which would operate to vary the speed of motor 21 to speed up or slow down the rate of rotation of forwarding screw 19 to raise or lower the pressure of delivery to the second cylinder 17. A suitable arrangement would include two pressure controlled micro-switches which are respectively actuated when a lower pressure limit is reached and when a high pressure limit is reached. The micro-switches then operate a four-way valve to move the piston on an air cylinder in one direction in one case and in the other direction in the other case. Then the piston is connected to vari-pitch pulleys which interconnect the motor 21 with forwarding screw 19 to vary the respective pitches of said pulleys and thus increase or decrease the rotational speed of said forwarding screw 19.

The thermoplastic material which can be extruded by this method and apparatus are the thermoplastics including the homo- and co-polymers of vinyl compounds, monovinyl aromatic compounds or their halogenated derivatives, such as styrene, methylstyrene, dimethylstyrene, -methylstyrene, chlorostyrene, methyl methacrylate, vinyl chloride, vinyl acetate, ethylene, etc. The low boiling normally liquid substances employed are those well-known in the art and include hydrocarbons, alcohols, ethers, aldehydes, nitriles and halogenated hydrocarbons boiling between 80° F. and 200° F. The cell size control additives include the carbonates or bicarbonates of ammonium, sodium or potassium admixed with organic acid, such as citric acid, tartaric acid, oxalic acid, and so on, or its salt or with boric acid or its salt. These additives also include the crystalline inorganic compounds, e.g., pigments, which are known in the art as nucleating agents.

Representative temperatures which can be advantageously employed in the heat plasticizing zone are 350° to 450° F., preferably 380° to 400° F. Those temperatures that are advantageously employed in the mixing and cooling zones are 200° to 300° F., preferably 225° to 275° F., and suitable extrusion temperatures are those below 325° F. It is of importance in this invention that, for example, without using conventional polystyrene beads, which contain blowing agents, polystyrene foam in the shape of film or sheet can be produced directly from pure polystyrene continuously at low cost.

*Example 1*

Polystyrene, which contained no blowing agents, was added with 1.4% of sodium bicarbonate and 1.6% of sodium citrate while it was fed into the hopper of the specially designed extruder (FIG. 3). The mixture was then heated up to 350° F. while it flowed through the extruder. In the pass of molten polystyrene 7% of pentane was added under 11 kg./cm.$^2$ pressure continuously to be well-mixed with the molten polystyrene, and the mixture was cooled at 260° F. and then heated at 250° F. The heated mixture was then extruded through the die (FIG. 3—27) into atmospheric pressure to blow to form a film of polystyrene foam of 0.25 mm. thick continuously. Thus obtained film can be printed, embossed or laminated onto paper and so on.

*Example 2*

After addition of 1.8% of ammonium tartarate, 1.3% of sodium bicarbonate and 6% of pentane to pure polystyrene, the mixture was treated in the same manner as Example 1, and a smooth-surfaced sheet of polystyrene foam of 1 mm. thick was extruded continuously. Thus obtained sheet can be vacuum formed or pressure formed into various shapes.

*Example 3*

After addition of 1.9% of sodium borate, 1.3% of sodium bicarbonate and 5.5% of petroleum ether to polystyrene which did not contain any additives, the mixture was treated in the same manner as Example 1, and the extrusion and the forming produced seamless cups of polystyrene foam continuously. Thus produced cups can be used as ice cream cups or coffee cups.

What is claimed:

1. Method of producing a foamed thermoplastic product from a polymer of a compound from the class consisting of monovinyl aromatic compounds and their halogenated derivatives, comprising, heat plasticizing and mixing said polymer and a cell-size control additive under pressure in the absence of blowing agents to form a heat plasticized mixture thereof; feeding said mixture under pressure to an injection zone; decompressing said mixture and injecting a low boiling normally liquid substance, boiling between 80° F. and 200° F. into said mixture; thereafter increasing the pressure and heating said mixture while subjecting it to a forwarding mixing action; thereafter subjecting the mixture to a forwarding mixing action while cooling the mixture to a temperature at which it is flowable but below the boiling point of the low boiling normally liquid substance at the pressure of said mixture; thereafter increasing the pressure of said mixture while continuing to cool; and thereafter continuously extruding the mixture into a zone of considerably lower pressure to cause the low boiling normally liquid substance to volatilize and thus expand said mixture.

2. Method as claimed in claim 1 wherein the thermoplastic material is polystyrene, the cell-size control additive is a mixture of sodium bicarbonate and citric acid and the low boiling normally liquid substance is pentane.

References Cited in the file of this patent

UNITED STATES PATENTS

| | | |
|---|---|---|
| 2,515,250 | McIntire | July 18, 1950 |
| 2,669,751 | McCurdy et al. | Feb. 23, 1954 |
| 2,836,851 | Holt | June 3, 1958 |
| 2,860,377 | Bernhardt et al. | Nov. 18, 1958 |
| 2,917,217 | Sisson | Dec. 15, 1959 |
| 2,928,130 | Gray | Mar. 15, 1960 |
| 2,948,665 | Rubens et al. | Aug. 9, 1960 |
| 2,987,774 | Jacobson | June 13, 1961 |
| 3,072,584 | Karpovich | Jan. 8, 1963 |

FOREIGN PATENTS

| | | |
|---|---|---|
| 210,728 | Australia | Oct. 9, 1957 |
| 854,586 | Great Britain | Nov. 23, 1960 |

OTHER REFERENCES

SPE Journal, "Controlled Density Polystyrene Foam Extrusion," July 1960, pp. 705–709.

Notice of Adverse Decision in Interference

In Interference No. 95,298 involving Patent No. 3,151,192, W. A. Jacobs and F. H. Collins, METHOD OF EXTRUDING A FOAMED THERMOPLASTIC PRODUCT, final judgment adverse to the patentees was rendered June 6, 1968, as to claim 1.

[*Official Gazette August 20, 1968.*]